(12) United States Patent
Cai et al.

(10) Patent No.: US 6,707,898 B1
(45) Date of Patent: Mar. 16, 2004

(54) ELAPSED TIME REMINDER FOR TELECOMMUNICATION NETWORK

(75) Inventors: Yigang Cai, Naperville, IL (US); Shiyan Hua, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 440 days.

(21) Appl. No.: 09/755,733

(22) Filed: Jan. 5, 2001

(51) Int. Cl.[7] .............................................. H04M 11/00
(52) U.S. Cl. .................. 379/201.01; 379/188; 379/192; 379/197; 379/88.19
(58) Field of Search .............................. 379/88.2, 88.01, 379/88.19, 192, 188, 197, 201.01, 190, 191, 196, 208

(56) References Cited

U.S. PATENT DOCUMENTS

| | | | | | |
|---|---|---|---|---|---|
| 5,848,132 | A | * | 12/1998 | Morley et al. ................. | 379/88 |
| 5,864,613 | A | * | 1/1999 | Flood .......................... | 379/188 |
| 5,930,343 | A | * | 7/1999 | Vasquez ....................... | 379/115 |
| 6,169,790 | B1 | * | 1/2001 | Flon ............................ | 379/112 |
| 6,178,231 | B1 | * | 1/2001 | Nabkel ..................... | 379/88.19 |
| 6,381,325 | B1 | * | 4/2002 | Hanson ................. | 379/218.01 |

* cited by examiner

Primary Examiner—William J. Deane, Jr.

(57) ABSTRACT

An elapsed time reminder system for a telecommunication network provides elapsed time reminder service to a party participating in a call in the network. A call state processing component processes requests for elapsed time reminder service from the requesting party. An elapsed time reminder interval may be specified by a requesting party, or a default interval may be used. When the service is invoked, a timer is reset to monitor call duration. When the reminder interval is reached, an elapsed time reminder announcement is played to the requesting party.

17 Claims, 2 Drawing Sheets

ELAPSED TIME REMINDER FOR TELECOMMUNICATION NETWORK

BACKGROUND OF THE INVENTION

1. Field of the Invention

This invention relates to voice communications in a telecommunication network. More particularly, the invention pertains to the monitoring of calls and the selective presentation of call information to call parties.

2. Description of the Prior Art

In a conventional telecommunication network, such as the Public Switched Telephone Network (PSTN), parties participating in a voice call are generally not able to monitor call duration unless they time the call themselves. Although callers using pay telephones or prepaid calling cards will receive a warning when their authorized telephone time is nearing an end, they are not told how long an active call has been in progress.

As a result, callers who make long distance calls, 900 charge calls, etc., or who receive collect calls, can incur significant telephone charges if they fail to pay attention to the length of the call. What would be desirable is a system for providing a warning or notification to a call party that serves as an indication of call duration. Such a system should preferably be available at the outset of a call as well as during a call, and should be available to each of the call parties, or at least the party who will be billed for a call.

SUMMARY OF THE INVENTION

A solution to the forgoing problem and an advance in the art is provided by an elapsed time reminder system for a telecommunication network. The elapsed time reminder system provides elapsed time reminder service to a party participating in a call in the network. A call state processing component of the elapsed time reminder system processes requests for elapsed time reminder service. An elapsed time reminder interval may be specified by a requesting party, or a default interval may be used. After the service is invoked, a timer is reset to monitor call duration. When the reminder interval is reached, an elapsed time reminder announcement is played to the requesting party.

Elapsed time reminder service can be provided in response to a request made by the requesting party at call initiation or during mid-call. The requesting party may either be a call originator or a call recipient. If service is requested at call initiation, the timer is preferably not reset until the call is connected between both parties. If service is requested during mid-call, the timer is preferably not reset until the call is reconnected following the request for service. Whether the elapsed timer reminder service is provided at call initiation or during mid-call, the service can be invoked based on digits dialed by the requesting party. These service invocation digits may include a service code and an elapsed time reminder period.

In its preferred embodiments, the invention is implemented using the existing IN (Intelligent Network) infrastructure of modern telephone networks, with appropriate modifications being made thereto. In particular, it is contemplated that there will be one or more service control points providing Intelligent Network services on behalf of switching nodes that setup calls between call originating and call terminating equipment. To provide elapsed time reminder service, the switching nodes are adapted to receive a service code and an elapsed time interval period value from the requesting party. The receiving switching node routes the service code and the elapsed time interval value to a service control point providing Intelligent Network services to the switching node. The service control point processes the service code and the elapsed time interval and then sends a timer reset request back to the switching node. The timer reset request contains a timer identifier and the elapsed time interval value specified by the requesting party. At the switching node, a timer corresponding to the timer identifier is reset. An elapsed time announcement is then generated whenever the timer reaches the elapsed time interval value.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
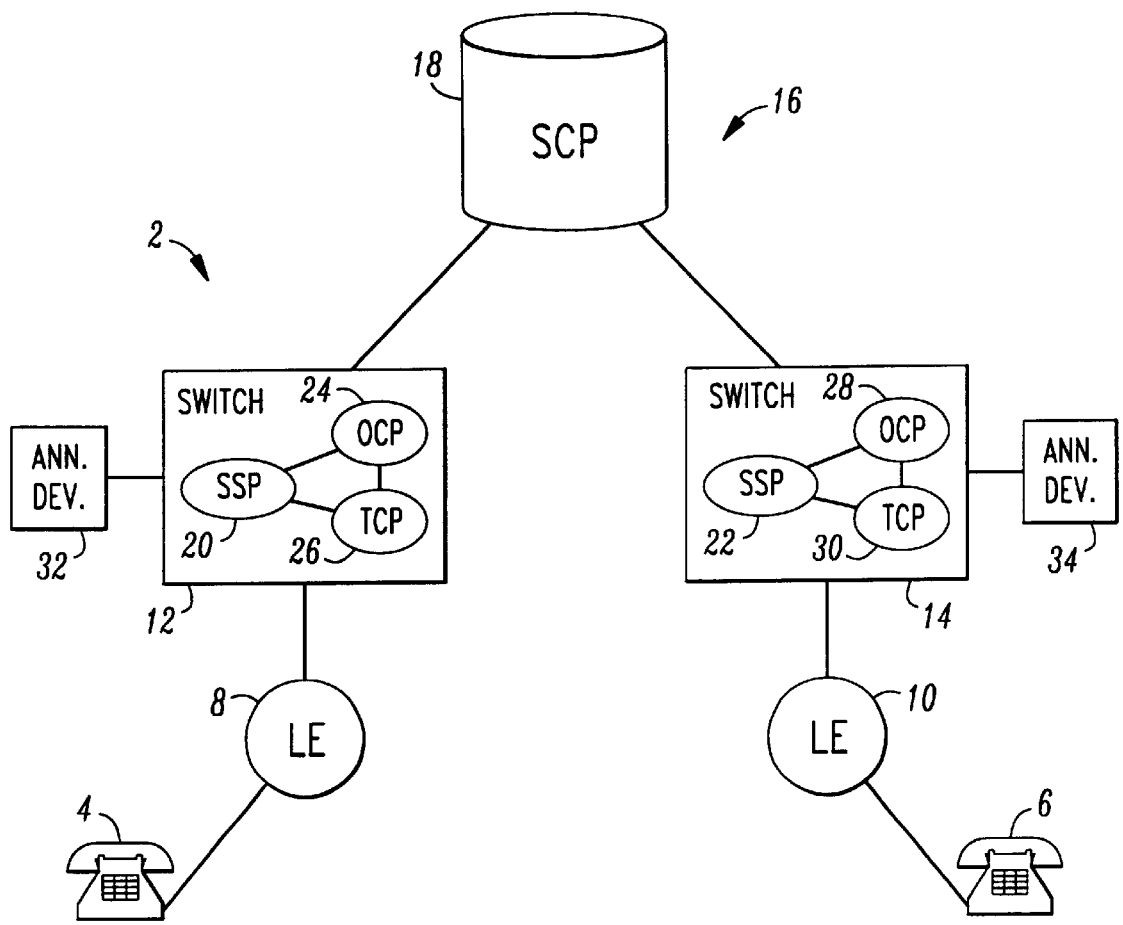
FIG. 1 is a functional block diagram showing a telecommunication system configured in accordance with the invention.

Turning now to the Drawing, FIG. 1 illustrates an exemplary telecommunication system 2 that is configured, according to preferred embodiments of the invention, in a telephone system providing voice communication between customer premises equipment 4 and 6. The latter are illustrated in FIG. 1 as conventional telephones, but could also comprise ISDN user equipment or the like. The customer premises equipment 4 and 6 respectively connect via LE (Local Exchange) pathways 8 and 10 to switches 12 and 14. Depending on whether the customer premises equipment 4 and 6 connect via single-user interfaces (e.g., POTS line customer premises drop points) or multiple-user interfaces (e.g., PBX systems, key telephone systems, etc.), the LE pathways 8 and 10 could function as either lines or trunks. The switches 12 and 14 may be conventionally situated at respective telecommunication system central offices or the like.

As is conventional, the telecommunication system 2 further includes an Intelligent Network (IN) 16 that assists the switches 12 and 14 to set up call connections on behalf of the subscribers they serve. The IN 16 includes an SCP (Service Control Point) 18 and a pair of SSPs (Service Switching Points) 20 and 22 that are co-located with the switches 12 and 14. Although not shown, the IN 16 also includes a plurality of packet switches, known as "signaling transfer points" (STPs), that route call signaling messages between the SCP 18 and the switches 12 and 14 as the latter engage in the establishment and termination of call connections. Except to the extent that their programming is modified to provide the functions of the present invention, the foregoing IN components are all conventional in nature.

In addition to the IN SSPs 20 and 22, the switches 12 and 14 also implement the usual OCP (Origination Call Processing) and TCP (Termination Call Processing) functions. More particularly, the switch 12 implements an OCP 24 and a TCP 26, while the switch 14 implements an OCP 28 and a TCP 30. Again, except to the extent their programming is modified to assist in implementing the present invention, the foregoing OCP and TCP functions are all conventional in nature.

A pair of announcement devices 32 and 34 complete the list of telecommunication system components that can be utilized to perform the functions of the invention. The announcement devices 32 and 34 are respectively connected to the switches 12 and 14. They are conventional in nature except to the extent that they have been modified to provide elapsed time information in accordance with the invention.

In its preferred embodiment, the invention is implemented as a new IN service that shall be referred to as ETR (Elapsed Time Reminder) service. According to this new service, a person operating the customer premises equipment 4 or 6 can request an announcement reminder of the elapsed time for a telephone call, including any ordinary non-prepaid call. ETR service can be invoked on a per-call basis either when dialing a telephone number, or during a call. The service can be invoked by either the calling party or the called party.

As described in more detail in the call examples given below, the ETR service disclosed herein utilizes one or more conventional IN TDPs (Trigger Detection Points) that will be defined according to the basic call state model being implemented in the telecommunication system 2. Assuming that a basic call state model fashioned upon ITU-T (International Telephone Union) recommendation Q.1224 is in use, the TDPs which can be used to provide ETR service include the TDP3 (Analyze_Information) trigger detection point, the TDP8 (Originating_midCall) trigger detection point, and the TDP 16 (Terminating_midCall) trigger detection point. The ETR service disclosed herein also utilizes a conventional INAP (Intelligent Network Application Protocol) ResetTimer operation that has been modified to broaden its normal usage. Lastly, the announcement devices 32 and 34 are used to provide ETR service announcement messages.

A requesting party can invoke ETR service in two ways, depending on their needs. One way to invoke the service is to prepend a prefix digit string to a dialed telephone number. The prefix digits may comprise a service code and an ETR interval period in minutes. The ETR interval period represents the time interval at which ETR announcements will be played. Another way to invoke the ETR service is during mid-call. This can be done using a hook flash operation followed by entry of digits representing the service code and the elapsed time. An exemplary ETR service invocation digit string has two components, namely, a service code that starts with "*" followed by two digits (e.g., "75"), and two digits representing the ETR interval period. Note that under either of the above ETR service implementation methods, provision may also be made for prompting the requesting party in the event that no ETR interval period is specified when ETR service is invoked. Alternatively, a default ETR interval period (e.g., 10 minutes) could be used.

Example 1

Invoking ETR Service When Dialing A Call

Figure 2:
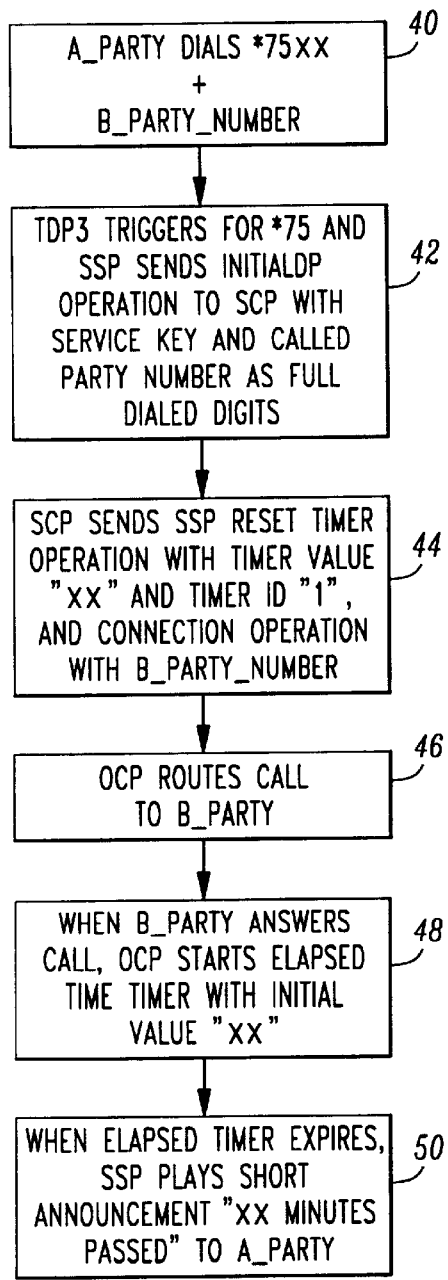
FIG. 2 is a flow diagram illustrating method steps performed in accordance with a first aspect of the invention.

With reference now to FIG. 2, and beginning at the step labeled by reference numeral 40, a requesting party (A_party) invokes ETR service by dialing "*75xx" followed by the number (B_party number) of a called party (B_party). It will be assumed that A_party uses customer premises equipment 4 and B_party uses customer premises equipment 6 (see FIG. 1). In step 42, a TDP3 (Analyzed_Information) trigger detection point in the call state model running in the switch 12 triggers for *75 and the SSP 20 sends an InitialDP (Initial Detection Point) operation to the SCP 18. The InitialDP operation includes a service key (that identifies the ETR service) and a called party number that includes *75xx +B_party_number.

Based on the service key information, the SCP 18 sends a ResetTimer operation to the SSP 20 in step 44. This portion of step 44 is implemented as a conventional INAP Reset-Timer operation that has been modified to broaden its normal usage for resetting the default SSP-SCP communication guard timer. In particular, the timer value sent as part of the modified ResetTimer operation contains the ETR interval period value "xx" specified by A_party. A timer ID (Identification) value is also sent as part of the modified ResetTimer operation. This parameter conventionally has a default value of "0" that indicates the SSP-SCP guard timer. For ETR service, this parameter is set to "1," to specify that an ETR timer is to be set. To complete step 44, the ECP 18 sends a conventional Connect operation to the SSP 20 with a destination routing address parameter containing the B_party_number.

In step 46, the OCP 24 routes the call to B_party. When B_party answers the call in step 48, the OCP 24 starts an ETR timer with an ETR interval period of "xx." In step 50, when the ETR timer expires, the SSP 20 invokes the announcement device 32 to play a short announcement to A_party indicating that "xx minutes have passed." The ETR timer is then reset. Subsequent announcements could either indicate that "another xx minutes have passed," or that "yy total minutes have passed," with "yy" being the value "xx" multiplied by the number of ETR interval periods that have elapsed.

Example 2

Invoking ETR Service During a Call

Figure 3:
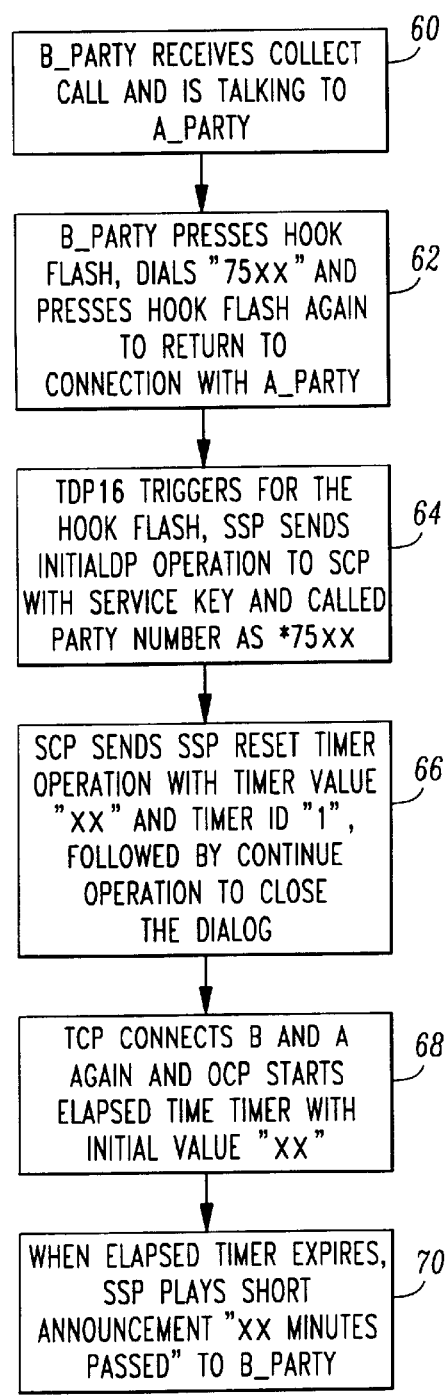
FIG. 3 is a flow diagram illustrating method steps performed in accordance with a second aspect of the invention.

With reference now to FIG. 3, and beginning with the step labeled by reference numeral 60, a requesting _party ) is assumed to receive a collect call from another party (A_party) and is in the talk stage. Again, it is assumed that A party uses customer premises equipment 4 and B_party uses customer premises equipment 6. In step 62, B_party presses a hook flash, invokes ETR service by dialing "*75xx," and then presses hook flash a second time to return to the connection with A_Party. Note that a hook flash can be produced by pressing the hook on a corded telephone or pressing a hook flash button on a cordless telephone. In step 64, a TDP 16 (Terminating_midCall) trigger detection point in the call state model running in the switch 14 triggers on the first hook flash. This causes the SSP 22 to send an InitialDP (Initial Detection Point) operation to the SCP 18. The InitialDP operation includes a service key (that identifies the ETR service) and a called party number that includes only *75xx.

Based on the service key information, the SCP 18 sends a ResetTimer operation to the SSP 20 in step 66. This portion of step 66 can again be implemented as a conventional INAP ResetTimer operation that has been modified to broaden its normal usage for resetting the default SSP-SCP communication guard timer. In particular, the timer value sent as part of the modified ResetTimer operation contains the ETR interval period value "xx" specified by B_party. A timer ID value is also sent as part of the modified ResetTimer operation. This parameter conventionally has a default value of "0" that indicates the SSP-SCP guard timer. For ETR service, this parameter is set to "1," to specify that an ETR timer is to be set. To complete step 66, the SCP 18 sends a conventional Continue operation to the SSP 22 to close the dialog between the SCP and the SSP.

In step 68, after the SSP 22 receives the Continue operation and the TCP 30 reconnects B_party to A_party. It also starts an ETR timer with an ETR interval period of "xx." In step 70, when the ETR timer expires, the SSP 22 invokes the announcement device 34 to play a short announcement to B_party indicating that "xx minutes have passed." The ETR timer is then reset. Subsequent announcements could either indicate that "another xx minutes have passed," or that "yy total minutes have passed," with "yy" being the value "xx" multiplied by the number of ETR interval periods that have elapsed.

It will be appreciated that Example 2 could be used when A arty invokes ETR service during a call. In that case, step 64 would cause a TDP (OrginatingMidCall) trigger detection point to trigger in response to the first hook flash.

Accordingly, an elapsed time reminder system for a telecommunication network has been described. The disclosed system can be very useful to persons who make charge calls and who may tend to forget about the call length, thereby inadvertently generating large telephone bills. Such persons can now invoke elapsed time reminder service when initiating a call and at any point during a call. The service will also be useful for persons receiving collect calls.

While various embodiments of the invention have been disclosed, it should be apparent that many variations and alternative embodiments could be implemented in accordance with the invention. For example, although examples are shown in which ETR service is requested on a per-call basis, it will be appreciated that the service could also be invoked as a service option that applies to multiple calls, or all calls, originated or terminated by a caller. It is understood, therefore, that the invention is not to be in any way limited except in accordance with the spirit of the appended claims and their equivalents.

What is claimed is:

1. A method for providing elapsed time reminder service to a party participating in a call in a telecommunication network, comprising the steps of:
    monitoring for a request for elapsed time reminder service from a requesting party at call initiation and following connection of said call while said call is in progress so that said service can be provided in response to a request made by said party at call initiation and at any time during mid-call;
    processing said request for elapsed time reminder service following receipt from said party;
    monitoring call duration while said call is in progress; and
    periodically providing information to said party regarding said call duration.

2. A method in accordance with claim 1 wherein said party is either a call originator or a call recipient.

3. A method in accordance with claim 1 wherein said call duration monitoring step is initiated when said call is connected between said party and another party.

4. A method in accordance with claim 1 wherein said call duration monitoring step is initiated when said call is reconnected between said party and another party following said party requesting invocation of said service.

5. A method in accordance with claim 1 wherein said service is provided based on digits dialed by said party.

6. A method in accordance with claim 5 wherein said digits include a service code and an elapsed time reminder period.

7. A method in accordance with claim 1 wherein said service is provided using Intelligent Network trigger detection points.

8. A method in accordance with claim 7 wherein said service is further provided using a reset timer operation.

9. A system for providing an elapsed time reminder to a party participating in a call in a telecommunication network, comprising:
    a call state monitoring component adapted to monitor for a request for elapsed time reminder service from a requesting party at call initiation and following connection of said call while said call is in progress so that said service can be provided in response to a request made by said party at call initiation and at any time during mid-call;
    a call state processing component adapted to process said request for elapsed time reminder service following receipt from said party;
    a timer for monitoring call duration while said call is in progress; and
    an announcement generator for periodically providing information to said party regarding said call duration.

10. A system in accordance with claim 9 wherein said party is either a call originator or a call recipient.

11. A system in accordance with claim 9 wherein said system is adapted to initiate said timer when said call is connected between said party and another party.

12. A system in accordance with claim 9 wherein said system is adapted to initiate said timer when said call is reconnected between said party and another party following said party requesting invocation of said service.

13. A system in accordance with claim 9 wherein said system is adapted to provide said service based on digits dialed by said party.

14. A system in accordance with claim 13 wherein said digits include a service code and an elapsed time reminder period.

15. A system in accordance with claim 9 wherein said system is adapted to provide said service using Intelligent Network trigger detection points.

16. A system in accordance with claim 15 wherein said system is further adapted to provide said service using a reset timer operation.

17. In an intelligent telecommunication network having one or more service control points providing Intelligent Network services on behalf of switching nodes that setup calls between call originating and call destination equipment, a method for providing an elapsed time reminder to a party participating in a call in the telecommunication network, comprising the steps of:
    monitoring for a request for elapsed time reminder service from a requesting part at call initiation and following connection of said call while said call is in progress so that said service can be provided in response to a request made by said party at call initiation and at any time during mid-call;
    receiving a service code and an elapsed time interval period value at a switching node in said telecommunication network;
    routing said service code and said elapsed time interval value to a service control point providing Intelligent Network services on behalf of said switching node;
    processing said service code and said elapsed time interval at said service control point;
    sending a timer reset request from said service control point to said switching node, said timer reset request containing a timer identifier and said elapsed time interval value;

resetting a timer corresponding to said timer identifier at said switching node; and generating an elapsed time announcement when said timer reaches said elapsed time interval value.

* * * * *